United States Patent
Hancu et al.

(10) Patent No.: US 10,030,483 B2
(45) Date of Patent: Jul. 24, 2018

(54) CARBON DIOXIDE AND HYDROCARBON ASSISTED ENHANCED OIL RECOVERY

(71) Applicant: General Electric Company, Schenectady, NY (US)

(72) Inventors: Dan Hancu, Clifton Park, NY (US); Michael Joseph O'Brien, Halfmoon, NY (US); Robert James Perry, Niskayuna, NY (US); Stanlee Teresa Buddle, Gloversville, NY (US); Mark Daniel Doherty, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 218 days.

(21) Appl. No.: 14/922,211

(22) Filed: Oct. 26, 2015

(65) Prior Publication Data

US 2017/0114269 A1   Apr. 27, 2017

(51) Int. Cl.
*E21B 41/00* (2006.01)
*C09K 8/62* (2006.01)
*C09K 8/588* (2006.01)
*C09K 8/594* (2006.01)

(52) U.S. Cl.
CPC .......... *E21B 41/0064* (2013.01); *C09K 8/588* (2013.01); *C09K 8/594* (2013.01); *C09K 8/62* (2013.01)

(58) Field of Classification Search
None
See application file for complete search history.

(56) References Cited

U.S. PATENT DOCUMENTS

| | | | |
|---|---|---|---|
| 4,136,738 A | 1/1979 | Haynes, Jr. et al. | |
| 4,299,286 A | 11/1981 | Alston | |
| 4,609,043 A | 9/1986 | Cullick | |
| 4,736,792 A | 4/1988 | Brown et al. | |
| 4,825,952 A | 5/1989 | Mzik | |
| 4,913,235 A * | 4/1990 | Harris | C09K 8/594 166/268 |
| 5,080,169 A | 1/1992 | Davis | |
| 5,143,632 A | 9/1992 | Woo | |
| 5,381,863 A * | 1/1995 | Wehner | E21B 43/164 166/268 |
| 5,725,054 A | 3/1998 | Shayegi et al. | |

(Continued)

FOREIGN PATENT DOCUMENTS

WO    2014170466 A1    10/2014

OTHER PUBLICATIONS

Xinwei et al., "Sensitivity Analysis of CO2 Storage Coefficient and CO2-EOR", Power and Energy Engineering Conference (APPEEC), 2010 Asia-Pacific, pp. 1-6, Mar. 28-31, 2010, Chengdu.

(Continued)

*Primary Examiner* — Anuradha Ahuja
(74) *Attorney, Agent, or Firm* — GE Global Patent Operation; Pabitra Chakrabarti (57) ABSTRACT

An efficient and cost-effective process of carbon dioxide recycling in enhanced oil recovery wells or in fracturing wells is provided. The process comprises recovering a hydrocarbon enriched stream of condensed carbon dioxide from and enhanced oil recovery (EOR) well or a fracturing well; adding to said stream one or more thickeners; and directing the thickened stream to the EOR well or fracturing well for recycled usage in EOR.

10 Claims, 2 Drawing Sheets

(56) References Cited

U.S. PATENT DOCUMENTS

| | | | |
|---|---|---|---|
| 5,778,977 A * | 7/1998 | Bowzer | E21B 43/164 166/252.1 |
| 5,794,697 A * | 8/1998 | Wolflick | E21B 43/385 166/169 |
| 2012/0055685 A1* | 3/2012 | Sanders | E21B 43/164 166/402 |
| 2012/0090838 A1* | 4/2012 | Collins | E21B 43/164 166/266 |
| 2012/0150519 A1 | 6/2012 | Bang et al. | |
| 2015/0345269 A1* | 12/2015 | Kelly | E21B 21/062 166/280.1 |

OTHER PUBLICATIONS

JH Bae, CA Irani, A Laboratory Investigation of Viscosified CO2 Process, SPE Advanced Technology Series, SPE-20467-PA, 1993 1(1), available at https://www.onepetro.org/journal-paper/SPE-20467-PA, Apr. 1993, 2 Pages.

DK Dandge, JP Heller, Polymers for Mobility Control in CO2 Floods, SPE International Symposium on Oilfield Chemistry, SPE-16271-MS, 1987, available from https://www.onepetro.org/conference-paper/SPE-16271-MS, 2 Pages.

RM Enick, "A literature review of attempts to increase the viscosity of dense carbon dioxide," Oct. 10, 1998; downloadable from http://www.netl.doe.gov/kmd/cds/disk22/c-direct%20co2%20viscosifying/co2thick19981010.pdf, 53 Pages.

* cited by examiner

CARBON DIOXIDE AND HYDROCARBON ASSISTED ENHANCED OIL RECOVERY

STATEMENT REGARDING FEDERALLY SPONSORED RESEARCH & DEVELOPMENT

This invention was made with Government support under contract number DE-AR0000292.awarded by the ARPA-e program. The Government has certain rights in the invention.

BACKGROUND

The disclosure relates generally to improvements in enhanced oil recovery processes in the field.

The amount of crude oil that can be extracted from an oil field can be increased by the use of various enhanced oil recovery (abbreviated EOR) techniques. Condensed carbon dioxide ($CO_2$) has been used for 40 years as a profitable EOR technique even though $CO_2$ flooding does not recover all of the oil in the formation regardless of whether the reservoir has been previously water flooded. One of the causes for this low oil recovery can be traced to the low density and viscosity of condensed $CO_2$. The viscosity of dense liquid or supercritical carbon dioxide (also referred to herein as condensed carbon dioxide) at typical $CO_2$ flooding conditions is ~0.05-0.10 cP and is much lower than that of the oil and brine in the formation (0.5-10 cP) which results in an unfavorable mobility ratio (M>1). This leads to viscous fingering, early $CO_2$ breakthrough, high $CO_2$ utilization ratios, elevated $CO_2$ production and re-compression, and depressed oil production rates even though the $CO_2$ flood is conducted at or above the minimum miscibility pressure (MMP). These problems can be exacerbated when the injection is completed in two or more producing zones. The low viscosity of condensed $CO_2$ promotes its flow into the more permeable layers that have been effectively water flooded, while disappointingly small amounts of condensed $CO_2$ enter the low permeability zones that contain more recoverable oil. Finally, the low viscosity of condensed $CO_2$ in reservoirs with communicating layers exacerbates gravity override. All these elements lead to low oil recovery and less than optimum storage capacity.

A $CO_2$ thickener would reduce the mobility of condensed $CO_2$, which would lead to maximizing the ratio of oil produced to $CO_2$ injected and increasing the capacity of the formation to retain $CO_2$ at the end of the project. However, thickening $CO_2$ to suppress early breakthrough of $CO_2$ in EOR is not easy because condensed $CO_2$ is a poor solvent for most organic molecules. Attempts to increase the viscosity of condensed $CO_2$ and raise it to a level comparable to that of oil via dissolution of high molecular weight polymers, associating polymers, or small associating molecules have been summarized in reviews and papers. R M Enick "A literature review of attempts to increase the viscosity of dense carbon dioxide," Oct. 10, 1998; "A Laboratory Investigation of Viscosified $CO_2$ Process, SPE Advanced Technology Series, SPE-20467-PA, 1993 1(1), and D K Dandge, J P Heller "Polymers for Mobility Control in $CO_2$ Floods, SPE International Symposium on Oilfield Chemistry, SPE-16271-MS, 1987.

In such previously attempted methods, typically, $CO_2$ is purified to >95% purity and then subsequently thickeners and/or cosolvents are added to the purified $CO_2$ so that it can be recycled in EOR. However, the purification and subsequent addition of thickeners and/or cosolvents are resource-intensive and expensive steps. There is a need in the field for cheaper and efficient methods of re-utilizing $CO_2$ for enhanced oil recovery.

BRIEF DESCRIPTION

Provided herein are techniques which alleviate some of the inefficiencies associated with the use and recycling of $CO_2$ in EOR. Provided herein are improved processes wherein the recycled $CO_2$ stream from oil wells (including EOR wells) is not fully purified, and contains light hydrocarbons (<C8) from the reservoir. These dissolved hydrocarbons act as a cosolvent thereby increasing the solubility of the thickeners in the $CO_2$ rich phase. Advantageously, the absence of a discrete $CO_2$ purification step reduces the cost of manufacturing and improves the efficiency of the EOR processes. Surprisingly, it was determined that purification of recovered condensed $CO_2$ prior to recycling the condensed $CO_2$ is not necessary. A condensed $CO_2$ stream from an oil well which also contains some low hydrocarbons can be used directly for $CO_2$ recycling processes without any purification.

Accordingly, in one aspect, provided herein is a process for carbon dioxide recycling comprising:
recovering a hydrocarbon enriched stream of condensed carbon dioxide from an enhanced oil recovery (EOR) well or a fracturing well;
adding to said stream one or more thickeners; and directing the thickened stream to the EOR well or fracturing well for recycled usage in EOR.

Also provided herein are certain functionalized polymers which are thickeners and are suitable for use in EOR processes.

DRAWINGS

These and other features, aspects, and advantages of the present invention will become better understood when the following detailed description is read with reference to the accompanying drawings in which like characters represent like parts throughout the drawings, wherein:

FIG. 1 shows a schematic representation of the processes described herein. After bulk phase separation of the oil, methane is removed from the effluent leaving behind a stream of carbon dioxide and hydrocarbons from which gasoline is separated by fractional distillation. The final stream contains carbon dioxide and natural gas liquid (NGLs) hydrocarbons. This stream is not purified further but is used directly. One or more thickeners are added and the thickened stream of carbon dioxide is recycled to the EOR well.

DETAILED DESCRIPTION

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the term "solvent" can refer to a single solvent or a mixture of solvents, unless otherwise indicated.

As used herein, "hydrocarbon enriched stream of condensed carbon dioxide" refers to liquid and/or supercritical carbon dioxide or any condensed form of carbon dioxide which also contains some hydrocarbons and which is recycled without further purification. Typically the hydrocarbon enriched stream of condensed carbon dioxide comprises low hydrocarbons or NGL hydrocarbons comprising from 2 to 6 carbons, or from 2 to 8 carbons, or from 2 to 10 carbons.

As used herein "gasoline" refers to a mixture of liquid hydrocarbons that are derived from petroleum. The hydrocarbons in gasoline typically contain between five and eight carbon atoms.

As used herein "condensed carbon dioxide" refers to liquid and/or supercritical carbon dioxide which is used for recovery of oil from oil-bearing formations. Liquid and/or supercritical carbon dioxide can be obtained under suitable conditions of pressure and/or temperature and such conditions are readily apparent to one of skill in the art.

As used herein "vinyl" refers to the group

As used herein, the term "alkyl" whether used alone or as part of a substituent group, includes straight and branched chains comprising one to eight carbon atoms. For example, alkyl radicals include methyl, ethyl, propyl, isopropyl, butyl, isobutyl, sec-butyl, t-butyl, pentyl and the like.

As used herein, a "straight or branched polymer" indicates that the referenced polymer may comprise a polymer with a linear structure or a polymer with shorter chains growing off the long chain at certain intervals, so that a branched structure is formed.

Implementing a $CO_2$ EOR project is a capital-intensive undertaking. It involves drilling or reworking wells to serve as both injectors and producers, installing a $CO_2$ recycle plant and corrosion resistant field production infrastructure, and laying $CO_2$ gathering and transportation pipelines. Recycling $CO_2$ requires purification of condensed $CO_2$ recovered from the wells. As such, operators strive to optimize and reduce the cost of purchase, injection and recycling wherever possible.

In the EOR/fracturing process for $CO_2$ thickening, the use of a HC—$CO_2$ mixture confers several advantages when compared to pure $CO_2$. The solubility of the thickener material in $CO_2$-hydrocarbons vs. pure $CO_2$ is increased, thus improving the efficacy of the thickener thereby allowing for the use of more effective, cheaper thickening additives compared to the existent ones developed for a pure $CO_2$ phase. Further, a condensed $CO_2$-hydrocarbons mixture is a more effective oil recovery fluid than pure condensed $CO_2$, thereby increasing the efficiency of oil recovery.

Currently used techniques for thickening of condensed $CO_2$ during oil and gas manufacturing involve the purification of $CO_2$ after removal of gasoline, followed by addition of thickening polymers and/or associating molecules along with cosolvents to the purified $CO_2$. The existing EOR methods suffer from limitations because the $CO_2$ recycling process is resource intensive. By contrast, the processes described herein streamline the EOR process while also allowing for the use of hydrocarbons from the well as cosolvents for thickening of condensed $CO_2$. In the methods described herein, the separation process is less costly (in terms of both operational expenditure and capital expenditure) as a low purity of the recovered $CO_2$ is acceptable for the recycling process allowing for savings on the cost of goods.

Figure 1:
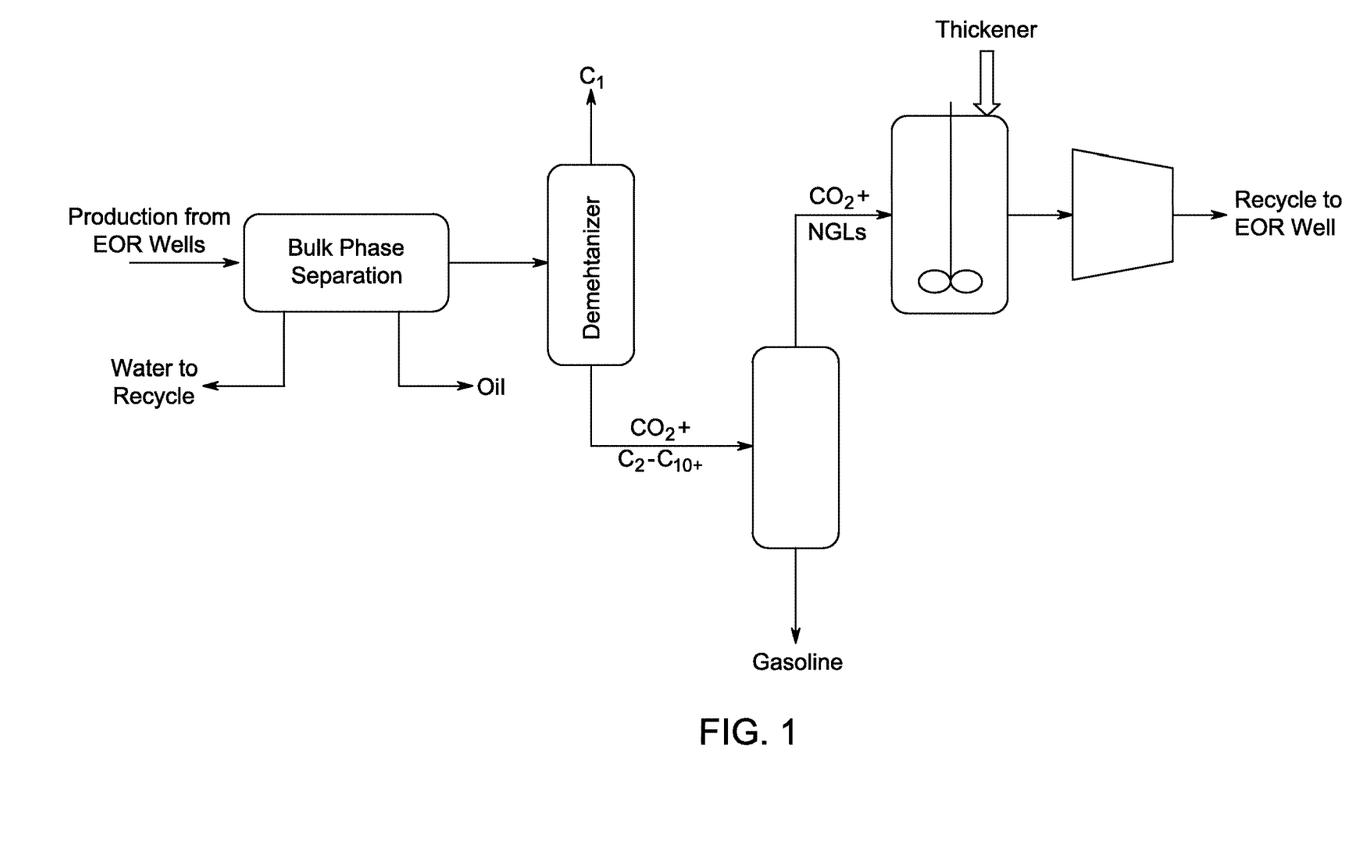

As shown in FIG. 1, after removal of methane, the remaining bulk liquid is processed into gasoline. After the removal of gasoline, the remaining effluent is a condensed $CO_2$ stream which is enriched in natural gas liquids comprising primarily $C_2$-$C_6$ hydrocarbons, or in the alternative, $C_2$-$C_8$ hydrocarbons, or $C_2$-$C_{10}$ hydrocarbons. Provided herein is a process comprising the recycling of said condensed $CO_2$ stream containing low hydrocarbons without further purification. In the instant process, thickeners are added to the condensed $CO_2$ stream containing hydrocarbons and the resulting thickened $CO_2$ is sent directly to the EOR well thereby reducing the number of steps involved in $CO_2$ recycling in EOR wells.

Accordingly, in one aspect, provided herein is a process for carbon dioxide recycling comprising:
recovering a hydrocarbon enriched stream of condensed carbon dioxide from an enhanced oil recovery (EOR) well or a fracturing well;
adding to said stream one or more thickeners; and
directing the thickened stream to the EOR well or fracturing well for recycled usage in EOR.

In another aspect, provided herein is a process for carbon dioxide recycling consisting essentially of:
recovering a hydrocarbon enriched stream of condensed carbon dioxide from an enhanced oil recovery (EOR) well or a fracturing well; then
without purification, adding to said stream one or more thickeners; and
directing the thickened stream to the EOR well or fracturing well for recycled usage in EOR.

In one embodiment, said hydrocarbon enriched stream of condensed carbon dioxide comprises a mixture of $C_2$-$C_6$ natural gas liquid hydrocarbons and is thickened without separation of the condensed carbon dioxide and the $C_2$-$C_6$ natural gas liquid hydrocarbons. In another embodiment, said hydrocarbon enriched stream of condensed carbon dioxide comprises a mixture of $C_2$-$C_8$ natural gas liquid hydrocarbons and is thickened without separation of the condensed carbon dioxide and the $C_2$-$C_8$ natural gas liquid hydrocarbons. In a further embodiment, said hydrocarbon enriched stream of condensed carbon dioxide comprises a mixture of $C_2$-$C_{10}$ natural gas liquid hydrocarbons and is thickened without separation of the condensed carbon dioxide and the $C_2$-$C_{10}$ natural gas liquid hydrocarbons.

In one embodiment said hydrocarbon enriched stream of condensed carbon dioxide comprises hydrocarbons in an amount sufficient for dissolution of the one or more thickeners.

In some embodiments, said hydrocarbon enriched stream of condensed carbon dioxide comprises between about 75% to about 97% of condensed carbon dioxide by volume of said stream. In alternate embodiments, said hydrocarbon enriched stream of condensed carbon dioxide comprises between about 75% to about 97% mole % of condensed carbon dioxide in said stream.

In some other embodiments, said hydrocarbon enriched stream of condensed carbon dioxide comprises between about 80% to about 95% of condensed carbon dioxide by volume of said stream. In alternate embodiments, said hydrocarbon enriched stream of condensed carbon dioxide comprises between about 80% to about 95% mole % of condensed carbon dioxide in said stream.

The amount of the thickener added to said hydrocarbon enriched stream of condensed carbon dioxide is sufficient to raise the viscosity of the hydrocarbon enriched stream of condensed carbon dioxide by at least about two times (2×), or alternatively at least about ten times (10×) its initial viscosity, wherein the initial viscosity is the viscosity of the hydrocarbon enriched stream of condensed carbon dioxide prior to the addition of the thickener. In other words, at a sufficiently high pressure, the carbon dioxide is condensed (behaves as a fluid) and the added thickeners further modify the viscosity of the hydrocarbon enriched carbon dioxide so that is it is at least about two times (2×), or alternatively at least about ten times (10×) higher when compared to the viscosity of the hydrocarbon enriched stream of condensed carbon dioxide prior to the addition of the thickener.

In some embodiments, the thickener is a polysiloxane polymer. In one instance, the polysiloxane polymer has a structure I $$\left[ R-\underset{\underset{Me}{|}}{\overset{\overset{Me}{|}}{Si}}-O \right]_q \underset{\underset{Me}{|}}{\overset{\overset{Me}{|}}{Si}}-R, \qquad (I)$$

wherein
R=H, Me, vinyl, OH, or OR';
R' is $C_{1-6}$ alkyl; and
q is an integer from 20 to 10000.

In some embodiments of Formula (I), q is 20 to 1000. In other embodiments of Formula (I), q is 1000 to 5000. In yet other embodiments of Formula (I), q is 5000 to 10000. In some instances, the thickener is a polysiloxane polymer comprising at least one functional group selected from the group consisting of (III)

wherein $R^5$ is $C_1$-$C_5$ alkyl, or hydrogen, and (IV)

wherein $R^6$ is $C_1$-$C_5$ alkyl, or hydrogen, and further comprises repeating units of structure IIA $$M_a D_b T_c Q_d, \qquad (IIA),$$

wherein
M has the formula $R^1{}_3SiO_{1/2}$;
D has the formula $R^2R^3SiO_{2/2}$;
T has the formula $R^4SiO_{3/2}$;
Q has the formula $SiO_{4/2}$;
and wherein each of $R^1$, $R^2$, $R^3$, and $R^4$ is independently $C_1$-$C_5$ alkyl; and a=2-10, b=15-500, c=0-10; and d=0-10.

In some of the embodiments described above, the thickener which is added to said hydrocarbon enriched stream of condensed carbon dioxide comprises a linear structure or a branched structure.

In some other instances, the thickener which is added to said hydrocarbon enriched stream of condensed carbon dioxide is a polymer comprising at least one functional group selected from the group consisting of:

(V)

(VI)

(VII)

wherein
a dotted line ---- indicates that the bond may be present or absent;
ring A, when present, is a fused 5 or 6 membered saturated, partially saturated, or unsaturated ring;
X is $C_1$-$C_8$ alkyl;
p is an integer from 2 to 6;
$R^7$ is independently, at each occurrence, $C_1$-$C_5$ alkyl or hydrogen;
$R^8$ is independently, at each occurrence, or $R^{10}$;
s is an integer from 2 to 20;
$R^9$ is $CH_2OAc$ or $C_1$-$C_6$ alkyl;
$R^{10}$ comprises repeating units of structure IIB $$M_aD_bT_cQ_d, \quad (IIB),$$

wherein
M has the formula $R^1{}_3SiO_{1/2}$;
D has the formula $R^2R^3SiO_{2/2}$;
T has the formula $R^4SiO_{3/2}$;
Q has the formula $SiO_{4/2}$;
and wherein each of $R^1$, $R^2$, $R^3$, and $R^4$ is independently $C_1$-$C_5$ alkyl; and a=1-10, b=0-30, c=0-10; and d=0-10.

In such instances described above, the thickener comprises a linear structure or a branched structure.

In another aspect, provided herein is a process for the recovery of oil from an oil-bearing formation, comprising the steps of
a) injecting condensed carbon dioxide into the formation through at least one injection well;
b) obtaining oil and a mixture of hydrocarbons and condensed carbon dioxide from the production well at a distance from the injection well;
c) adding to said stream one or more thickeners comprising at least one functional group selected from the group consisting of (III)

and (IV)

wherein
$R^5$ is $C_1$-$C_5$ alkyl, or hydrogen;
$R^6$ is $C_1$-$C_5$ alkyl, or hydrogen; and further comprising repeating units of structure IIA $$M_aD_bT_cQ_d, \quad (IIA),$$

wherein
M has the formula $R^1{}_3SiO_{1/2}$;
D has the formula $R^2R^3SiO_{2/2}$;
T has the formula $R^4SiO_{3/2}$;
Q has the formula $SiO_{4/2}$;
and wherein each of $R^1$, $R^2$, $R^3$, and $R^4$ is independently $C_1$-$C_5$ alkyl; and a=2-10, b=15-500, c=0-10; and d=0-10.
or
a functional group selected from the group consisting of:

(V)

(VI)

and (VII)

wherein
a dotted line ---- indicates that the bond may be present or absent;
ring A, when present, is a fused 5 or 6 membered saturated, partially saturated, or unsaturated ring;
X is $C_1$-$C_8$ alkyl;
p is an integer from 2 to 6;
$R^7$ is independently, at each occurrence, $C_1$-$C_5$ alkyl or hydrogen;
$R^8$ is independently, at each occurrence, or $R^{10}$;
s is an integer from 2 to 20;
$R^9$ is $CH_2OAc$ or $C_1$-$C_6$ alkyl;
$R^{10}$ comprises repeating units of structure IIB $$M_aD_bT_cQ_d, \quad (IIB),$$

wherein
M has the formula $R^1{}_3SiO_{1/2}$;
D has the formula $R^2R^3SiO_{2/2}$;
T has the formula $R^4SiO_{3/2}$;
Q has the formula $SiO_{4/2}$;
and wherein each of $R^1$, $R^2$, $R^3$, and $R^4$ is independently $C_1$-$C_5$ alkyl; and a=1-10, b=0-30, c=0-10; and d=0-10; and
d) directing the thickened stream to the oil bearing formation for recycled usage in oil recovery.

In some embodiments, the process described above further comprises
b.i) removing methane from the mixture of hydrocarbons and condensed carbon dioxide;
prior to step (c).

In some embodiments, the process described above further comprises
b.ii) separating gasoline from the mixture of hydrocarbons and condensed carbon dioxide to obtain a hydrocarbon enriched stream of condensed carbon dioxide;
prior to step (c).

In some embodiments of the process described above, said hydrocarbon enriched stream of condensed carbon dioxide of step b.ii) comprises a mixture of $C_2$-C8 natural gas liquid hydrocarbons and is thickened without separation of the condensed carbon dioxide and the hydrocarbons.

In one group of embodiments, the process for the recovery of oil from an oil-bearing formation, comprises the steps of a), b), b.i), b.ii), c) and d).

In certain instances of the embodiments described above, said hydrocarbon enriched stream of condensed carbon dioxide of step b.ii) above comprises a mixture of $C_2$-$C_6$ natural gas liquid hydrocarbons and is thickened without separation of the condensed carbon dioxide and the hydrocarbons. In other instances, said hydrocarbon enriched stream of condensed carbon dioxide of step b.ii) above comprises a mixture of $C_2$-$C_8$ natural gas liquid hydrocarbons and is thickened without separation of the condensed carbon dioxide and the hydrocarbons. In further instances, said hydrocarbon enriched stream of condensed carbon dioxide of step b.ii) above comprises a mixture of $C_2$-$C_{10}$ natural gas liquid hydrocarbons and is thickened without separation of the condensed carbon dioxide and the hydrocarbons.

For any of the embodiments described above, a choice of which functionalized polymer is most suitable, e.g., anthraquinone-based versus thioxanthone-based silicone polymers comprising functional groups of Formula (III), or (IV), or polymers comprising functional groups of Formula (V), (VI) or (VII) will depend in part on solubility and miscibility considerations. For example, some of the functionalized polymers may exhibit greater solubility in supercritical carbon dioxide; whereas other functionalized polymers are especially effective in gelling various hydrocarbons.

The functional group (or multiple functional groups) can be attached to the polymer as an end group, i.e., terminating one or more sites on the polymer. Alternatively, the functional group can be attached to another site on the polymer. For example, one or more functional groups could be incorporated as pendant groups extending from another portion of the polymer chain.

The general ratio between the portion of the polymer comprising units of Formula IIA or IIB, and the functional groups of Formula III, IV, V, VI, or VII, can be important, in terms of solubilizing the polymer in a selected solvent for a given end use. In supercritical $CO_2$ solvent, the ratio of repeating structures in Formula IIA or IIB to the total number of functional groups of Formula III, IV, V, VI, or VII, should be sufficient to solubilize the polymer, at a temperature within the range of about 30° C. to about 200° C., and at a pressure within the range of about 1100-10,000 psi. The preferred temperature range for full solubility should be about 35° C. to about 150° C.; and most preferably, about 40° C. to about 120° C.

The relative amounts of repeating units and functional groups can conveniently be expressed in terms of weight. For example, in some preferred embodiments for use with a supercritical $CO_2$ solvent, the total amount of functional groups should often be less than about 30% by weight of the weight of the overall polymer. In some specific amounts, the level is in the range of about 5% to about 15% by weight.

The amount of modified polymer used with the hydrocarbon solvent will depend on a number of factors, such as the desired viscosity of the combined material, the boiling point of the solvent; the pressure at which the polymer/solvent material is to be used in a given process; and the solubility of the polymer in the solvent.

In some embodiments, the functionalized polymer is present in an amount sufficient to raise the viscosity of the hydrocarbon enriched stream of carbon dioxide by at least about two times (2×) its initial viscosity, wherein the initial viscosity is the viscosity of the hydrocarbon enriched stream of condensed carbon dioxide prior to the addition of the thickener. In some other embodiments, the functionalized polymer is present in an amount sufficient to raise the viscosity of the hydrocarbon enriched stream of carbon dioxide by at least about ten times (10×) its initial viscosity, wherein the initial viscosity is the viscosity of the hydrocarbon enriched stream of condensed carbon dioxide prior to the addition of the thickener. This assumes the polymer/solvent combination will be used at a temperature in the range of about 0° C. to about 140° C.; and a pressure in the range of about atmospheric pressure to about 10,000 psi.

In other embodiments, the amount of functionalized polymer present should be sufficient to transform the hydrocarbon enriched stream of carbon dioxide to a gel, at selected temperature and pressure conditions. As used herein, a "gel" is generally defined as a solid or semi-solid, jelly-like material. Gels for the purpose of this disclosure are usually substantially dilute, cross-linked materials which exhibit no flow in the steady state. It should be apparent from the discussion herein that an embodiment of this disclosure is directed to a thickening agent (or in some cases, a gellant) for use in recycling of carbon dioxide (or organic liquid compositions or supercritical fluids), based on the modified polymers described herein.

The use of the modified polymers described herein can increase the viscosity of the supercritical $CO_2$, as described previously. The experiments shows in FIG. 2 indicate a decrease in cloud point pressure by <2000 Psi in the presence of n-octane (dashed lines) compared to pure $CO_2$ (solid lines), and improved solubility of the thickener material in the $CO_2$-n-octane mixtures. The overall fracking fluid then becomes thicker, and has the ability to more efficiently fracture rock within the shale formation, thereby releasing more oil and gas, which can be directed to the well surface. Moreover, the need for large amounts of water is minimized or eliminated. Furthermore, the polymers used herein may be more environmentally benign than some of the other fracking components used in the prior art, like acrylates and acrylamides.

EXAMPLES

The following examples illustrate methods and embodiments in accordance with the disclosure. Unless specified otherwise, all ingredients may be commercially available from such common chemical suppliers as Alpha Aesar, Inc. (Ward Hill, Mass.), Sigma Aldrich (St. Louis, Mo.), Spectrum Chemical Mfg. Corp. (Gardena, Calif.), and the like.

Example 1

Synthesis of Linear, Anthraquinone Amide Terminated PDMS (M'$D_{30}$M')

Anthraquinone allyl amide (0.25 g, 0.86 mmol) was mixed with toluene (5 mL) and the hazy mixture was heated to ~50° C. $M^H D_{30} M^H$ (1.0 g, 0.85 mmol) in toluene (2 mL) was then added, followed by a drop of Karstedt's catalyst. Heating was continued up to 80° C. As the reaction proceeded, the mixture clarified. After a few hours, proton NMR indicated that the allyl amide was consumed but there was a small amount of SiH remaining Thus a small amount of additional anthraquinone allyl amide was added. After 30 minutes, the solvent was removed on a rotary evaporator yielding essentially a quantitative yield of product as a brown oil that solidified on cooling to a rubbery material. $^1$H NMR (CDCl$_3$) δ: 8.56 (s, 2H); 8.25-8.38 (m, 8H); 7.83 (m, 4H); 6.5-7.2 (m, 2H); 3.53 (br q, J=6.4 Hz, 4H); 1.73 (m, 4H); 0.66 (m, 4H); 0.03-0.17 (m, 271H). $^{13}$C{$^1$H} NMR (CDCl$_3$): 182.28, 182.22, 165.64, 139.84, 134.84, 134.30, 134.24, 133.23, 133.06, 127.69, 127.25, 124.87, 43.33, 23.56, 15.55, 1.37, 1.17, 1.00, 0.82, 0.63, 0.13 ppm.

Example 2

Synthesis of Anthraquinone Amide Based Copolymer-1

Anthraquinone allyl amide (1.71 g, 5.9 mmol) was mixed with toluene (20 mL) and heated to 90° C. under nitrogen. To the hazy solution was added one drop of Karstedt's catalyst followed by a hydride fluid with average composition $M^H D_{20} D^H{}_2 M^H$ (5.0 g, 10.4 mmol). Within a few minutes the mixture clarified. After another 30 minutes, allylated PPG (5.00 g, 4.8 mmols) was added. The mixture was then allowed to react overnight. NMR at this point showed that there was still about 10% SiH left. Therefore a little more allylated PPG (0.50 g) was added and the oil bath temperature was turned up to 110° C. After 2 hours the reaction mixture was carefully placed under vacuum and the bulk of the toluene was stripped off. The mixture was cooled some, diluted with chloroform and the solvents removed on a rotary evaporator. The result was 11.89 g of product (97%) as a very viscous oil that solidified on cooling to a hazy orange gel. The melting behavior of this material was evaluated using differential scanning calorimetry (DSC, Perkin-Elmer DSC7, heating rate of 10° C./min) The melting endotherm exhibited an Onset Temperature of 44.20° C., a Peak Temperature of 55.73° C. and a Delta H of 3.8997 J/g. $^1$H NMR (CDCl$_3$) δ: 7.5-8.6 (m, 17H), 3.25-3.75 (m, 131H), 1.3-1.9 (m, 18H), 1.13 (br s, 119H), 0.90 (t, J=7.2 Hz, 5.9H), 0.63 (m, 4.5H), 0.49 (m, 3.4H), 0.06 (br s, 167H). $^{13}$C{$^1$H} NMR (CDCl$_3$): 182.34, 182.28, 165.50, 139.80, 134.89, 134.33, 134.28, 134.10, 127.73, 127.68, 127.28, 127.11, 124.88, 75.47, 75.33, 75.29, 75.20, 75.09, 74.99, 74.75, 74.73, 74.70, 74.66, 73.33, 72.95, 72.92, 72.88, 72.84, 72.16, 43.28, 31.74, 23.85, 23.58, 23.53, 19.26, 17.52, 17.42, 17.30, 17.21, 15.52, 14.14, 13.88, 13.43, 1.15, 0.99, 0.11, 0.08, −0.62 ppm.

Example 3

Synthesis of Anthraquinone Amide Based Copolymer-2

Hydride fluid $M^H D_{70} D^H{}_7 M^H$ (10.0 g, 15.7 mmol SiH), solid allyl anthraquinone-2-carboxamide (2.0 g, 6.9 mmol) and toluene (50 mL) were combined and heated to 90-95° C. under nitrogen. A drop of Karstedt's catalyst in toluene (1 mL) was then added. The result was stirred for approximately 15-20 minutes during which time all of the allyl anthraquinone-2-carboxamide went into solution. After another 20 minutes, allyl acetate (1.0 g, 10 mmol) was added. After another 50 minutes, a small sample was removed, stripped on a rotary evaporator, and analyzed by proton NMR. This showed the reaction to be complete. Therefore, the toluene and excess allyl acetate were removed under vacuum. The result was 11.7 g of product as a rubbery yellow solid. The melting behavior of this material was evaluated using differential scanning calorimetry (DSC, Perkin-Elmer DSC7, heating rate of 10° C./min) A tri-modal endotherm was observed. The main melting endotherm exhibited an Onset Temperature of 42.47° C., a Peak Temperature of 48.93° C. and a Delta H of 1.8082 J/g. The other two endotherms peaked at ~61° C. and 67° C. $^1$H NMR (CDCl$_3$) δ: 7.6-8.7 (m, 39H), 6.6 (br s), 4.02 (t, J=7.0 Hz, 7H), 3.52 (br q, J=6.4 Hz, 11H), 1.99-2.02 (m, 19H), 1.6-1.9 (m, 23H), 0.66 (m, 11H), 0.54 (m, 7H), 0.01-0.16 (m, 715H). 13C{1H} NMR (CDCl$_3$): 182.48, 182.39, 170.02, 165.53, 139.80, 135.02, 134.35, 134.14, 133.39, 133.15, 127.87, 127.76, 124.78, 66.82, 43.30, 23.57, 23.26, 22.69, 22.28, 20.92, 15.53, 13.33, 1.39, 1.18, 1.12, 1.01, 0.84, 0.72, 0.69, 0.64, 0.13, −0.62, −3.00 ppm.

Example 4

Synthesis of Anthraquinone Amide Branched Polymer-1

A branched aminosilicone with average composition $M'_4 D_{80} T_{3.5}$ (23.0 g, 13.8 mmol NH$_2$) was dissolved in chloroform (65 mL) under nitrogen. Next, triethylamine (2.5 mL, 17.9 mmol) was added followed by anthraquinone-2-carbonyl chloride (3.73 g, 13.8 mmol). After stirring overnight, hexanes (90 mL) and Celite® (3 g) were added and the mixture was filtered. There appeared to be a little bit of gel on the walls of the filter flask, so a little more Celite® (~2 g) was added and the mix was refiltered. The resulting solution was then stripped on a rotary evaporator. The result was 27.9 g of a slightly hazy material. Therefore it was dissolved in chloroform and washed twice with DI water. The phase separations took some time to finish (there was a stubbornly persistent rag layer in the top water phase). After drying over potassium carbonate, the solvent was then removed on a rotary evaporator yielding 24.3 g of product as a yellow oil that solidified on cooling to a clear yellow rubbery material. $^1$H NMR (CDCl$_3$) δ: 8.57 (s, 4H); 8.25-8.40 (m, 16H); 7.83 (m, 8H); 6.5-7.2 (m, 4H); 3.76 (q, J=6.8 Hz, 0.78H residual ethoxy); 3.53 q, J=6.4 Hz, 8H); 1.73 (m, 8H); 1.22 (t, J=6.8 Hz, 1.29H, residual ethoxy); 0.66 (m, 8H); 0.07-0.15 (m, 569H). $^{13}$C{$^1$H} NMR (CDCl$_3$): 182.51, 182.41, 165.49, 139.80, 135.03, 134.43, 134.36, 133.40, 133.36, 133.16, 127.89, 127.39, 124.76, 43.30, 23.59, 15.54, 1.39, 1.20, 1.02, 0.93, 0.85, 0.83, 0.79, 0.69, 0.65, 0.56, 0.14 ppm.

Example 5

Synthesis of Anthraquinione Amide Branched Polymer-2

A branched aminosilicone of average composition $M'_4 D_{88} T_{3.5}$ (10.0 g, 5.5 mmol NH$_2$) was dissolved in chloroform (30 mL) under nitrogen. Next, triethylamine (1.0 mL, 7.2 mmol) was added followed by anthraquinone-2-carbonyl chloride (1.50 g, 5.5 mmol). After stirring overnight, the reaction mixture was diluted with hexanes (45 mL) and filtered into a separatory funnel. The resulting solution was washed twice with DI water and once with saturated sodium chloride. After drying over anhydrous potassium carbonate, the solvents were removed on a rotary evaporator to yield 10.48 g (93%) of a yellow oil that solidified to a rubbery solid on cooling to room temperature. The melting behavior of this material was evaluated using differential scanning calorimetry (DSC, Perkin-Elmer DSC7, heating rate of 10° C./min) The melting endotherm exhibited an Onset Temperature of 34.14° C., a Peak Temperature of 46.53° C. and a Delta H of 3.2400 J/g. $^1$H NMR (CDCl$_3$) δ: 8.57 (s, 4H); 8.25-8.40 (m, 16H); 7.83 (m, 8H);

6.6 (br s); 3.53 (q, J=6.4 Hz, 8H); 1.74 (m, 8H); 0.66 (m, 8H); 0.05-0.16 (m, 636H). $^{13}$C{$^1$H} NMR (CDCl$_3$): 182.49, 182.40, 165.49, 139.80, 135.02, 134.43, 134.35, 133.39, 133.36, 133.16, 127.89, 127.38, 124.77, 43.30, 23.59, 15.54, 1.39, 1.20, 1.02, 0.93, 0.85, 0.74, 0.14, −2.30 ppm.

Example 6

Synthesis of Thioxanthone-10,10-Dioxide Amide Branched Polymer

Thioxanthone-10,10-dioxide-2-carboxylic acid (1.8 g, 6.2 mmol) was combined with thionyl chloride (10 mL, 137 mmol) and a small amount of pyridine (0.1 g) and heated to reflux under nitrogen for 1.5 hours. At this point, the excess thionyl chloride was removed on a rotary evaporator. Petroleum ether (20 mL) was added and this was removed on the rotary evaporator as well. The solid acid chloride was then mixed with THF (30 mL) and stirred under nitrogen. A solution of branched aminosilicone with average composition M'$_4$D$_{88}$T$_{3.5}$ (11.35 g, 6.2 mmol NH$_2$) and triethylamine (1.2 mL, 8.6 mmol) in THF (20 mL) was then added. After stirring overnight, the reaction mixture was filtered and the clear filtrate was stripped on the rotary evaporator. The residue was then dissolved in chloroform and the resulting solution was washed twice with deionized water. After drying over anhydrous potassium carbonate, the chloroform was removed under reduced pressure yielding 11.77 g (89.8% yield) of product as a clear-orange, rubbery solid. The melting behavior of this material was evaluated using differential scanning calorimetry (DSC, Perkin-Elmer DSC7, heating rate of 10° C./min) The melting endotherm exhibited an Onset Temperature of 54.33° C., a Peak Temperature of 63.87° C. and a Delta H of 3.3491 J/g. $^1$H NMR (CDCl$_3$) δ: 8.60 (s, 4H), 8.33 (m, 8H), 8.19 (m, 8H), 7.90 (m, 4H), 7.81 (m, 4H), 6.75 (br s, NHs), 3.50 (m, 8H), 1.72 (m, 8H), 0.65 (m, 8H), 0.04-0.16 (m, 590H). $^{13}$C{$^1$H} NMR (CDCl$_3$): 177.71, 164.59, 142.70, 140.76, 139.33, 134.91, 133.62, 133.41, 130.64, 130.40, 129.28, 126.90, 124.13, 123.60, 43.37, 23.51, 15.53, 1.37, 1.18, 1.00, 0.92, 0.83, 0.72, 0.64, 0.54, 0.13, −2.32 ppm.

Example 7

Synthesis of Thioxanthone-10,10-Dioxide Amide Linear Polymer

Thioxanthone-10,10-dioxide-2-carboxylic acid (0.48 g, 1.7 mmol) was combined with thionyl chloride (3 mL, 41 mmol) and a small amount of pyridine (2 drops) and heated to reflux under nitrogen for 2 hours. The excess thionyl chloride was removed under vacuum on a rotary evaporator, then a few mLs of petroleum ether was added and this was evaporated off as well. The resulting solid residue was cooled to room temperature and mixed with THF (6 mL) under nitrogen. A solution of Gelest DMS-A15 (2.5 g, 1.7 mmol) and trimethylamine (0.3 mL, 2.2 mmol) in THF (4 mL) was then added. After stiffing 2 hours, a small amount of Celite® was added and the mixture was filtered to remove solids. The THF was then removed under vacuum and the residue thus obtained was dissolved in chloroform. The solution was washed twice with deionized water and once with saturated sodium chloride. After drying over anhydrous potassium carbonate, the chloroform was removed under reduced pressure on a rotary evaporator. The result was 2.52 g (85% yield) product as a yellow rubbery solid. $^1$H NMR (CDCl$_3$) δ: 8.61 (s, 2H), 8.34 (t, J=7.4 Hz, 4H), 8.22 (d, J=8.0 Hz, 2H), 8.18 (d, J=8.0 Hz, 2H), 7.91 (t, J=7.6 Hz, 2H), 7.82 (t, J=7.6 Hz, 2H), 6.71 (br s, NHs), 3.51 (q, J=6.8 Hz, 4H), 1.72 (m, 4H), 0.65 (m, 4H), 0.05-0.16 (m, 277H). $^{13}$C{$^1$H} NMR (CDCl$_3$): 177.76, 164.61, 142.74, 140.77, 139.31, 134.93, 133.64, 133.42, 130.66, 130.40, 129.30, 126.87, 124.17, 123.62, 43.38, 23.51, 15.53, 1.38, 1.19, 1.08, 1.01, 0.64, 0.13 ppm.

Example 8

Synthesis of Silicone with Pendant Anthraquinone Amides

An aminopropyl functional silicone with general composition MD30D'5M (3.0 g, 5.0 mmols NH2) was dissolved in THF (10 mL) under nitrogen. Triethylamine (0.8 mL, 5.7 mmol) was added followed by anthraquinone-2-carbonyl chloride (1.37 g, 5.0 mmol). The result was allowed to stir overnight at room temperature. At this point, the mixture was filtered to remove solids. The THF was then removed under vacuum and the residue thus obtained was dissolved in chloroform. The solution was washed twice with deionized water and once with saturated sodium chloride. After drying over anhydrous potassium carbonate, the chloroform was removed under reduced pressure on a rotary evaporator. The result was 3.45 g (82% yield) of product as a yellow solid. $^1$H NMR (CDCl$_3$) δ: 7.5-8.6 (br m, 38H), 3.53 (m, 10H), 1.70-1.89 (m, 10H), 0.66 (m, 10H), 0.03-0.18 (m, 203H).

Example 9

Synthesis of Silicone Functionalized Benzene Trisamide

M$^{Bu}$D$_{10.8}$M(CH$_2$)$_3$NH$_2$ (10.0 g, 9.54 mmol) was treated with triethylamine (2.0 mL, 14.35 mmol, 1.5 equiv.) in THF and trimesoyl chloride (0.847 g, 3.18 mmol, 0.33 equiv.) was added as a THF solution resulting in the formation of a white precipitate. The mixture was stirred under air at room temperature for two hours at which point the reaction mixture was concentrated and diluted with hexane. The white solid was removed by filtration and the remaining pale yellow filtrate was stripped on the rotovap and dried under vacuum (70 mTorr) with the aid of a heat gun to give a pale yellow gel (10.1 g, 3.06 mmol, 97%). $^1$H NMR (CDCl$_3$, 400.13 MHz) δ: 8.38 (3.0 H, s, aryl C—H), 6.52 (1.9 H, broad t, NH), 3.47 (6.0 H, overlapping t, NCH$_2$), 1.67 (6.0 H, mult, NCH$_2$CH$_2$), 1.33 (12.0 H, mult, CH$_2$CH$_2$CH$_3$), 0.90 (9.0 H, t, J=6.8 Hz, CH$_3$), 0.70 to 0.50 (12.2 H, overlapping mult, SiCH$_2$), 0.3 to −0.1 (231.7 H, SiMe). $^{13}$C NMR (CDCl$_3$, 100.6 MHz) δ: amide: 165.47; aromatic: 135.28, 127.89, aliphatic: 43.29, 26.35, 25.43, 23.56, 17.94, 15.51, 13.79; SiMe: 1.40, 1.18, 1.14, 1.03, 0.66, 0.16, 0.11.

Example 10

Synthesis of Silicone Functionalized Benzene Diamide

M$^{Bu}$D$_{10.8}$M(CH$_2$)$_3$NH$_2$ (12.0 g, 11.45 mmol) was treated with triethylamine (2.0 mL, 14.35 mmol, 1.25 equiv.) in THF and phthaloyl chloride (0.83 mL, 5.76 mmol, 0.5 equiv.) was added to the THF solution resulting in the formation of a white precipitate. The mixture was stirred under air at room temperature for two hours at which point the reaction mixture was concentrated and diluted with hexane. The white solid was removed by filtration and the remaining pale yellow filtrate was stripped on the rotovap and dried under vacuum (60 mTorr) with the aid of a heat gun to give a viscous yellow liquid/gel (12.8 g, 5.75 mmol, 100%). $^1$H NMR (CDCl$_3$, 400.13 MHz) δ: 7.61 (1.5 H, dd, J=5.8 and 3.3 Hz, aryl C—H), 7.48 (2.1 H, dd, J=5.8 and 3.3 Hz, aryl C—H), 6.76 (1.2 H, broad t, NH), 3.39 (3.6 H, overlapping t, NCH$_2$), 1.62 (3.7 H, mult, NCH$_2$CH$_2$), 1.33 (8.1 H, mult, CH$_2$CH$_2$CH$_3$), 0.90 (6.0 H, t, J=7.1 Hz, CH$_3$), 0.58 (8.3 H, mult, SiCH$_2$), 0.3 to −0.1 (158.1 H, SiMe). $^{13}$C NMR (CDCl$_3$, 100.6 MHz) δ: amide: 169.13; aromatic: 134.13, 133.80, 130.10, 128.40, 123.13, aliphatic: 43.14, 26.35, 25.43, 23.38, 17.94, 15.44, 13.79; SiMe: 1.40, 1.14, 1.03, 0.66, 0.16, 0.12.

Example 11

Synthesis of trans-cyclohexane-1,2-dicarboxamide silicone 1 trans-1,2-cyclohexanedicarboxylic acid (0.50 g, 2.90 mmol, 1.0 equiv.) was refluxed in thionyl chloride until a homogeneous solution was obtained at which point the reaction mixture was evaporated and the resulting light brown residue was taken up in THF and stripped again to ensure complete removal of thionyl chloride. This residue was taken up in THF and added to a stirring THF solution (~100 mL total) of M$^{Bu}$D$_{10.8}$M(CH$_2$)$_3$NH$_2$ (6.1 g, 5.82 mmol, 2.0 equiv.) and triethylamine (1.5 mL, 10.76 mmol, 3.7 equiv.) resulting in the formation of a white precipitate. This mixture was stirred at room temperature for one hour at which point the white precipitate (Et$_3$NHCl) was removed by filtration through a pad of Celite®. Volatiles were removed on the rotary evaporator and the resulting pale orange liquid was taken up in hexanes, filtered to remove a small amount of white solid and evaporated to dryness under vacuum (100 mTorr) with heating to yield a pale orange medium viscosity liquid (6.4 g, 2.87 mmol, 99%). $^1$H NMR (CDCl$_3$, 400.13 MHz) δ: 5.74 (1.0 H, broad t, J=5.1 Hz, NH), 3.29 (2.0 H, apparent sextet, J$_{ave}$=7.0 Hz, NHCHH), 3.05 (2.0 H, broad sextet, J$_{ave}$=7.0 Hz, NHCHH), 2.35 (1.6H, mult, CHC(O)NH), 1.82 (3.8H, broad mult, cyclohexyl), 1.70 to 1.40 (6.4 H, overlapping mult, cyclohexyl and CH$_2$'s), 1.32 (10.7 H, broad mult, CH$_2$'s), 0.90 (6.4 H, t, J=6.9 Hz, CH$_3$), 0.65 to 0.45 (8.0 H, mult, 4×SiCH$_2$), 0.30 to −0.10 (160.9 H, SiMe). $^{13}$C NMR (CDCl$_3$, 100.6 MHz) δ: amide: 174.853; aliphatic: 47.72, 42.29, 29.17, 26.36, 25.44, 24.94, 23.46, 17.95, 15.32, 13.80; SiMe: 1.41, 1.16, 1.04, 0.67, 0.17, 0.10.

Example 12

Synthesis of Silicone terminated cyclohexane-1,2-diamide 2

(1R,2R)-(−)-1,2-diaminocyclohexane (0.245 g, 2.14 mmol) and M$^{Bu}$D$_{24.9}$M(CH$_2$)$_{10}$CO$_2$H (14.45 g, 91% purity, ~70% branched isomer: M$^{Bu}$D$_{24.9}$MCH(CH$_3$)(CH$_2$)$_8$CO$_2$H, 4.28 mmol, 1.99 equiv.) were combined in THF (40 mL). N,N'-Dicyclohexylcarbodiimide (0.883 g, 4.28 mmol, 1.99 equiv.) was dissolved in 5 mL of THF and this solution was added to the silicone/diamine solution and the resulting pale brown solution was stirred at room temperature overnight. The mixture was then evaporated to dryness, taken up in hexane and filtered to remove a fine white precipitate. The volatiles were again evaporated resulting in a pale yellow low viscosity liquid which slowly became hazy. This mixture was taken up in DCM (100 mL) and washed with aqueous acetic acid (pH=6, 2×100 mL), water (100 mL), saturated aqueous NaHCO$_3$ (2×100 mL) and water (100 mL). The combined aqueous washings were split in half and each half was extracted with DCM (100 mL, then 50 mL) after which the organic fractions were combined, dried over MgSO$_4$, filtered and dried under vacuum to give a pale yellow liquid in which a white precipitate formed upon standing at room temperature over the course of a week. The mixture was transferred to centrifuge tubes and centrifuged at 3500 rpm for 20 minutes and allowed to stand undisturbed for several days to allow all solids to settle. The pale yellow-brown supernatant was decanted to give the product as a transparent low viscosity liquid (9.28 g, 2.05 mmol, 96% yield). $^1$H NMR (CDCl$_3$, 400.13 MHz) δ (ppm): 3.91 (broad t, 0.4 H, J=11.3 Hz, CHNO$_2$CCH$_2$), 2.43 (t, 2.4 H, J=7.3 Hz, CH$_2$CO$_2$) 2.10 to 1.05 (overlapping mult, 74.0 H, CH$_2$'s), 0.90 (overlapping t, 10.9 H, 2×CH$_3$CH$_2$CH$_2$CH$_2$Si+ 70% of 2×SiCHCH$_3$), 0.56 (mult, 8.0 H, 4×SiCH$_2$), 0.40 to −0.30 (361.0 H, SiMe). $^{13}$C NMR (CDCl$_3$, 100.62 MHz) δ (ppm): amide: 154.13; aliphatic: 56.26, 53.31, 49.64, 36.01, 33.46, 32.77, 31.88, 29.57, 29.52, 29.41, 29.38, 29.29, 29.05, 28.96, 28.88, 26.42, 26.33, 25.52, 25.43, 25.33, 24.72, 23.22, 22.66, 18.26, 17.93, 14.07, 13.75; SiMe: 1.36, 1.12, 1.00, 0.62, 0.13.

Example 13

Synthesis of linear silicone functionalized cis-cyclohexane-1,3,5-tricarboxamide cis-1,3,5-cyclohexanetricarboxylic acid (1.00 g, 4.67 mmol, 1.0 equiv.) was refluxed in thionyl chloride until the mixture became homogeneous at which point the reaction mixture was evaporated and the resulting pale yellow residue was taken up in THF and stripped again to ensure complete removal of thionyl chloride. This residue was taken up in THF and added to a stirring THF solution (~100 mL total) of M$^{Bu}$D$_{10.8}$M(CH$_2$)$_3$NH$_2$ (14.6 g, 13.93 mmol, 2.99 equiv.) and triethylamine (2.25 mL, 16.14 mmol, 3.5 equiv.) resulting in the formation of a white precipitate. This mixture was stirred at room temperature for two hours before the white precipitate (Et$_3$NHCl) was removed by filtration through a pad of Celite®. Volatiles were removed on the rotary evaporator resulting pale yellow residue was heated under vacuum (50 mTorr) to yield a pale yellow gel (15.0 g, 4.54 mmol, 97%). $^1$H NMR (CDCl$_3$, 400.13 MHz) δ: 5.86 (1.6 H, broad s, NH), 3.22 (5.5 H, broad mult, NHCH2), 2.50 to 1.90 (6.1 H, overlapping broad mult, cyclohexyl CH and CH$_2$), 1.80 to 1.40 (9.3H, broad overlapping mult, cyclohexyl and CH$_2$'s), 1.33 (12.4H, broad mult, CH$_2$'s), 0.90 (9.0H, t, J=6.8 Hz, CH$_3$), 0.70 to 0.40 (12.0 H, mult, 6×SiCH$_2$), 0.30 to −0.10 (235.9 H, SiMe). $^{13}$C NMR (CDCl$_3$, 100.6 MHz) δ: aliphatic: 42.56, 26.34, 25.43, 23.48, 17.94, 15.48, 13.78; SiMe: 1.39, 1.14, 1.03, 0.65, 0.16, 0.11.

Example 14

Synthesis of branched silicone terminated cyclohexane-1,3,5-triamide cis-1,3,5-cyclohexanetricarboxylic acid (1.221 g, 5.65 mmol) and thionyl chloride (2.5 mL, 34.27 mmol, 6.1 equiv.) were combined in a side arm flask fitted with a reflux condenser and magnetic stir bar. The heterogeneous mixture was heated to a gentle reflux (85° C.) under N$_2$ for 3.5 h at which point the triacid had fully dissolved indicating conversion to the acid chloride. The volatiles were removed and the residue was taken up in THF. $M_3T(CH_2)_3NH_2$ (6.0 g, 16.96 mmol, 3.00 equiv.) and triethylamine (3.5 mL, 25.111 mmol, 4.4 equiv.) were combined in THF and the acid chloride solution was added under a stream of $N_2$ resulting in a mild exotherm and the formation of a white solid. The mixture was stirred at room temperature for 2 h until the heat had dissipated at which point the $Et_3NHCl$ precipitate was removed by filtration through Celite®. The volatiles were removed under vacuum with heating to give the product as a fluffy white solid (4.6 g, 3.76 mmol, 66% yield). $^1H$ NMR ($CDCl_3$, 400.13 MHz) δ (ppm): 5.64 (broad s, 2 H, NH), 3.22 (broad q, 5.9 H, $NCH_2CH_2CH_2Si$), 2.40 to 2.00 (overlapping broad m, 4.9 H, $CH_2$'s and cyclohexyl), 1.75 to 1.40 (overlapping broad m, 10.4 H, $CH_2$'s and cyclohexyl), 0.45 (broad mult, 6.4 H, $SiCH_2$), 0.30 to −0.10 (81.0 H, SiMe). $^{13}C$ NMR ($CDCl_3$, 100.62 MHz) δ (ppm): amide: 174.25; aliphatic: 43.93, 42.29, 32.04, 30.31, 23.56, 11.85; SiMe: 1.78. m.p.=344.7° C.

Example 15

Synthesis of branched silicone functionalized benzene trisurea

Sodium azide (1.75 g, 26.919 mmol, 7 equiv.) was dissolved in 10 mL of deionized water and cooled to 0° C. Separately, 1,3,5-benzenetricarbonyl chloride (1.006 g, 3.789 mmol, 1 equiv.) was dissolved in 10 mL of THF and cooled to 0° C. The acid chloride solution was added to the stirring sodium azide solution resulting in the formation of 1,3,5-benzenetricarbonyl azide as a white precipitate. The mixture was stirred at 0° C. for 2 h behind a blast shield at which point 200 mL of cold toluene and 10 mL of water were added to dissolve all solids. The toluene layer was isolated, washed with water (3×80 mL), saturated aqueous brine (80 mL), dried over $MgSO_4$ and filtered. The filtrate was collected and transferred to a round bottom flask fitted with a reflux condenser connected to a nitrogen inlet and heated to 100° C. for several hours until gas evolution ($N_2$ extrusion) ceased. The solution was then removed from the oil bath and aminopropyltris(trimethylsiloxy)silane (4.022 g, 11.369 mmol, 3.00 equiv.) was added to the hot toluene solution and stirred vigorously overnight. As the mixture cooled to room temperature, it became hazy and the viscosity of the solution increased. The volatiles were then removed under vacuum to produce the intended product as a pale yellow solid (3.291 g, 2.607 mmol, 69% yield). $^1H$ NMR ($CDCl_3$, 400.13 MHz) δ (ppm): 8.24 (broad s, 0.5 H, NH), 8.72 (broad s, 3.4 H, $H_{Ar}$), 5.38 (broad s, 0.6 H, NH), 3.15 (broad s, 4.9 H, $NHCH_2$), 1.55 (broad s, 9.0 H, $CH_2CH_2Si$), 0.46 (broad s, 6.0 H, $CH_2Si$), 0.30 to −0.15 (84.0 H, SiMe). $^{13}C$ NMR ($CDCl_3$, 100.62 MHz) δ (ppm): 43.20, 24.25, 11.95, 1.85, 1.74.

Example 16

Synthesis of linear silicone functionalized benzene trisurea

Sodium azide (1.75 g, 26.919 mmol, 7 equiv.) was dissolved in 10 mL of deionized water and cooled to 0° C. Separately, 1,3,5-benzenetricarbonyl chloride (1.0036 g, 3.780 mmol, 1 equiv.) was dissolved in 10 mL of THF and cooled to 0° C. The acid chloride solution was added to the stirring sodium azide solution resulting in the formation of 1,3,5-benzenetricarbonyl azide as a white precipitate. The mixture was stirred at 0° C. for 2 h behind a blast shield at which point 200 mL of cold toluene and 10 mL of water were added to dissolve all solids. The toluene layer was isolated, washed with water (3×80 mL), saturated aqueous brine (80 mL), dried over $MgSO_4$ and filtered. The filtrate was collected and transferred to a round bottom flask fitted with a reflux condenser connected to a nitrogen inlet and heated to 100° C. for two hours until gas evolution ($N_2$ extrusion) ceased. The solution was then removed from the oil bath and $M^{Bu}D_{10.8}M(CH_2)_3NH_2$ (11.903 g, 11.354 mmol, 3.004 equiv.) was added to the hot toluene solution and stirred vigorously over the weekend. No apparent haziness or viscosity increase was noted. The volatiles were then removed under vacuum to produce to give a colorless gel like solid which $^1H$ NMR showed to be contaminated with a small amount of the aminosilicone. The solid was taken up in 400 mL of chloroform, washed with 2 mM aqueous HCl, 2×200 mL of water, 200 mL of saturated aqueous brine, dried over $MgSO_4$ and filtered. The filtrate was then evaporated to dryness to give the intended product as a colorless waxy gel like solid (12.077 g, 3.609 mmol, 95% yield). $^1H$ NMR ($CDCl_3$, 400.13 MHz) δ (ppm): 8.18 (broad s, 0.6 H, NH), 6.76 (broad s, 3.1 H, $H_{Ar}$), 5.40 (broad s, 0.5 H, NH), 3.11 (broad s, 4.2 H, $NHCH_2$), 1.52 (broad s, 5.0 H, $CH_2CH_2Si$), 1.33 (broad mult, 14.1 H, $CH_2CH_2CH_3$), 0.91 (t, 9.9 H, $CH_2CH_3$), 0.58 (broad t, 12.0 H, $CH_2Si$), 0.30 to −0.20 (242.3 H, SiMe). $^{13}C$ NMR ($CDCl_3$, 100.62 MHz) δ (ppm): 43.25, 26.35, 25.43, 24.14, 17.94, 15.61, 13.78, 1.19, 1.14, 1.03, 0.16.

Example 17

Synthesis of peracetylated benzene trisurea

Sodium azide (1.823 g, 28.043 mmol, 7.2 equiv.) was dissolved in 10 mL of deionized water and cooled to 0° C. Separately, 1,3,5-benzenetricarbonyl chloride (1.0337 g, 3.894 mmol, 1 equiv.) was dissolved in 10 mL of THF and cooled to 0° C. The acid chloride solution was added to the stirring sodium azide solution resulting in the formation of 1,3,5-benzenetricarbonyl azide as a white precipitate. The mixture was stirred at 0° C. for 2 h behind a blast shield at which point 200 mL of cold toluene and 10 mL of water were added to dissolve all solids and the blast shield was removed. The toluene layer was isolated, washed with water (3×80 mL), saturated aqueous brine (80 mL), dried over $MgSO_4$ and filtered. The filtrate was collected and transferred to a round bottom flask fitted with a reflux condenser connected to a nitrogen inlet and heated to 100° C. for several hours until gas evolution ($N_2$ extrusion) ceased. The solution was then removed from the oil bath. Separately, D-glucamine hydrochloride pentaacetate (5.000 g, 11.687 mmol, 3.0 equiv.) and triethylamine (2.0 mL, 14.349 mmol, 1.2 equiv. relative to the amine hydrochloride) were combined in 40 mL of dichloromethane and stirred until a colorless homogeneous solution was obtained. This dichloromethane solution was added to the hot toluene solution and stirred vigorously overnight. As the mixture cooled to room temperature, it became hazy and the viscosity of the solution increased. The volatiles were then removed under vacuum and the resulting off white solid was taken up in 200 mL of THF and stirred for approximately 30 minutes at which time the solution was filtered to remove a white solid ($Et_3NHCl$). The filtrate was concentrated under vacuum, taken up in 150 mL of chloroform, washed with water (3×100 mL), brine (100 mL), dried over $MgSO_4$ and filtered.

Volatiles were stripped from the filtrate on a rotary evaporator and dried under high vacuum with heat to produce the desired product as a pale yellow solid (4.6 g, 3.345 mmol, 86% yield). $^1$H NMR (CDCl$_3$, 400.13 MHz) δ (ppm): 7.48 (broad s, 3.2 H, NH), 6.93 (broad s, 2.8 H, H$_{Ar}$), 6.00 to 5.00 (overlapping broad s, 15.1 H, 12×CHOAc+3×NH), 4.37 (broad s, 2.9 H, CHHOAc), 4.14 (broad s, 3.0 H, CHHOAc), 3.80 to 3.00 (broad mult, 6.0 H. NHCH$_2$), 2.13, 2.10, 2.03, 1.98 (broad s, 46.6 H, 15×OAc). $^{13}$C NMR (CDCl$_3$, 100.62 MHz) δ (ppm): 171.03, 170.03, 155.88, 139.83, 103.82, 70.96, 69.14, 61.83, 40.11, 20.94, 20.71, 20.60. DSC: endothermic transitions @ 81.33, 162.67, 203.00 and 250.34° C.

Example 18

Cloud Point Measurements of cis-cyclohexane-1,3,5-tricarboxamide

Figure 2:
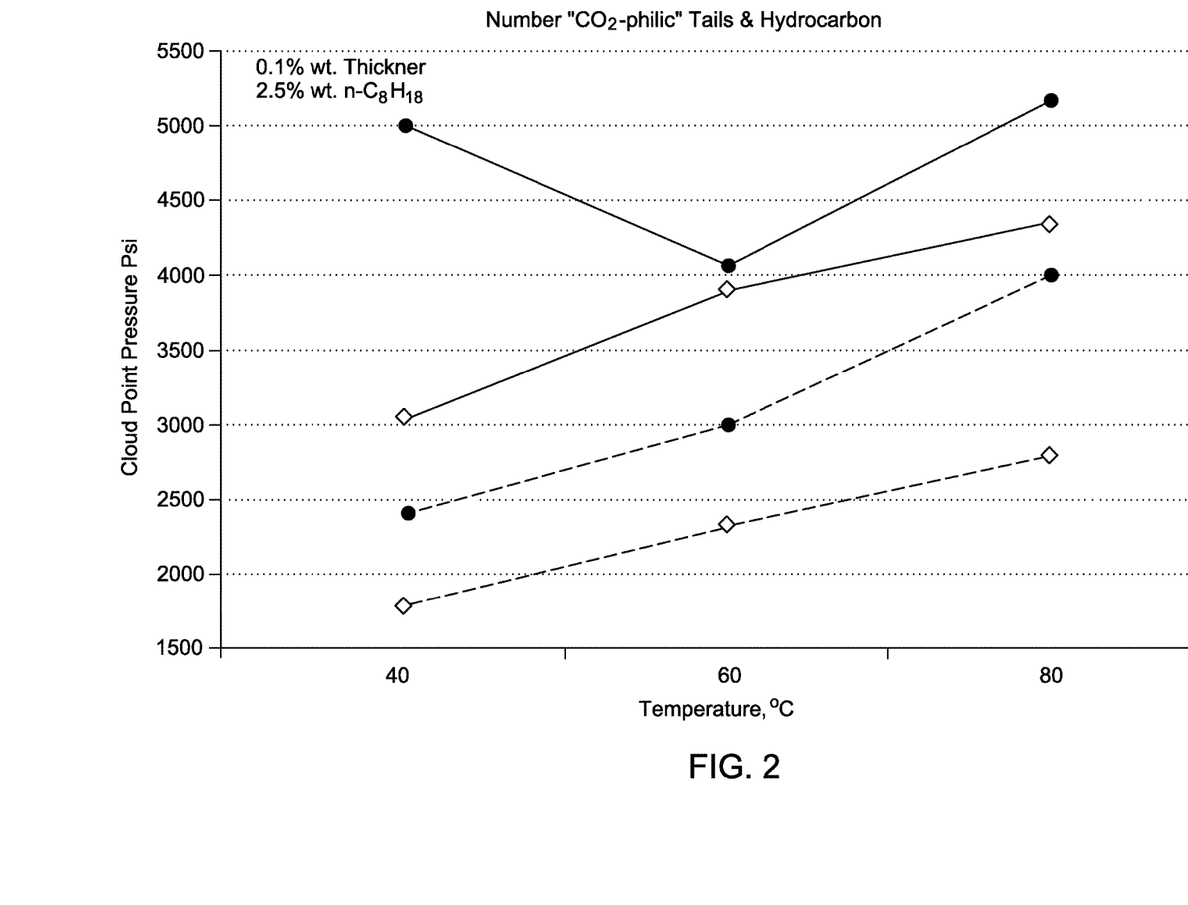
FIG. 2 shows the results from experiments which were conducted to demonstrate improved solubility of thickeners in $CO_2$—n-octane mixtures vs. pure $CO_2$. The circles represent experiments conducted with the polymer shown in Example 13. The diamonds represent experiments conducted with the polymer shown in Example 11.

Linear silicone functionalized cis-cyclohexane-1,3,5-tricarboxamide (0.025 g) synthesized in Example 13 was placed in a Supercritical Fluid Extraction Phase Monitor (SFT PM2) 10 cc view cell. The reactor was sealed with a 1" wrench, and filled with liquid CO$_2$ (12 g, 1450 Psi, Air Gas, 99.99% with 1500 Psi helium pressure pad) at T=22° C. After the CO$_2$ charging, the temperature of the cell was raised to 40° C., and mixing was started. Once the temperature reached 40° C., pressure was further increased to 6500 Psi via the manual syringe pump to ensure full dissolution of the solid sample. The pressure was then slowly decreased to 4700 Psi until the solution became cloudy due to onset of the phase separation. Finally, the pressure was cycled between 4700-5300 Psi for a number of times until the cloud point pressure was determined (P=5000+/−50 Psi). The procedure was repeated for 60° C., and 80° C. and the data is shown in FIG. 2.

Example 19

Cloud Point Measurements of Cloud of trans-cyclohexane-1,2-dicarboxamide silicone 1

Cloud point pressure of trans-cyclohexane-1,2-dicarboxamide silicone 1 synthesized in Example 11 was measured according to the procedure described in Example 18. Cloud point pressures at 40 C, 60 and 80 C are shown in FIG. 2.

Example 20

Cloud Point Measurements of cis-cyclohexane-1,3,5-tricarboxamide and octane

Cloud point pressure of cis-cyclohexane-1,3,5-tricarboxamide (0.025 g) and n-octane (Aldrich, 99.9%, 0.3 g) were measured according to procedure described in Example 18. Cloud point pressures of the mixture at 40 C, 60 C, and 80 C are shown in FIG. 2, indicating a cloud point depression of more than 1000 Psi vs. the cloud point pressure in the presence of pure CO$_2$.

Example 22

Cloud Point Measurements of trans-cyclohexane-1,2-dicarboxamide silicone 1 and octane Cloud point pressure of trans-cyclohexane-1,2-dicarboxamide silicone 1 (0.025 g) and n-octane (Aldrich, 99.9%, 0.3 g) were measured according to procedure described in Example 19. Cloud point pressures of the mixture at 40 C, 60 C, and 80 C are shown in FIG. 2, indicating a cloud point depression of more than 1500 Psi vs. the cloud point pressure in the presence of pure CO$_2$.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A process for carbon dioxide recycling comprising:
recovering a hydrocarbon enriched stream of condensed carbon dioxide from an enhanced oil recovery (EOR) well or a fracturing well;
adding to said stream one or more thickeners;
and directing the thickened stream to the EOR well or fracturing well for recycled usage in EOR,
wherein a thickener of the one or more thickeners is a polymer comprising at least one functional group as follows:

wherein
bonds indicated by a dotted line are absent;
ring A is absent;
X is C$_1$-C$_8$ alkyl;
p is an integer from 2 to 6;
R$^7$ is independently, at each occurrence, hydrogen;
R$^8$ is independently, at each occurrence, R$^{10}$;
R$^{10}$ comprises repeating units of structure IIB $$M_a D_b T_c Q_d \quad \text{(IIB)}$$

wherein
M has the formula R$^1_3$SiO$_{1/2}$;
D has the formula R$^2$R$^3$SiO$_{2/2}$;
T has the formula R$^4$SiO$_{3/2}$;
Q has the formula SiO$_{4/2}$;
and wherein each of R$^1$, R$^2$, R$^3$, and R$^4$ is independently C$_1$-C$_5$ alkyl; and a=1-10, b=0-30, c=0-10; and d=0-10.

2. The process of claim 1, wherein said hydrocarbon enriched stream of condensed carbon dioxide comprises a mixture of C$_2$-C$_8$ natural gas liquid hydrocarbons and is thickened without separation of the condensed carbon dioxide and the C$_2$-C$_8$ natural gas liquid hydrocarbons.

3. The process of claim 1, wherein said hydrocarbon enriched stream of condensed carbon dioxide comprises between about 75% to about 97% of condensed carbon dioxide by volume of said stream.

4. The process of claim 1, wherein said hydrocarbon enriched stream of condensed carbon dioxide comprises between about 80% to about 95% of condensed carbon dioxide by volume of said stream.

5. The process of claim 1, wherein the amount of the one or more thickeners is sufficient to raise the viscosity of the hydrocarbon enriched stream of condensed carbon dioxide by at least about ten times (10×) its initial viscosity, wherein the initial viscosity is the viscosity of the hydrocarbon enriched stream of condensed carbon dioxide prior to the addition of the thickener.

6. The process of claim 1, wherein the polymer comprises a linear structure or a branched structure.

7. A process for recovery of oil from an oil-bearing formation, comprising the steps of
a) injecting condensed carbon dioxide into the formation through at least one injection well;
b) obtaining oil and a mixture of hydrocarbons and condensed carbon dioxide from a production well at a distance from the at least one injection well;
c) adding to said mixture one or more thickeners comprising
a functional group as follows:

wherein
bonds indicated by a dotted line are absent;
ring A, is absent;
X is $C_1$-$C_8$ alkyl;
p is an integer from 2 to 6;
$R^7$ is independently, at each occurrence, hydrogen;
$R^8$ is independently, at each occurrence, $R^{10}$;
$R^{10}$ comprises repeating units of structure IIB $$M_a D_b T_c Q_d, \qquad (IIB)$$

wherein
M has the formula $R^1_3 SiO_{1/2}$;
D has the formula $R^2 R^3 SiO_{2/2}$;
T has the formula $R^4 SiO_{3/2}$;
Q has the formula $SiO_{4/2}$;
and wherein each of $R^1$, $R^2$, $R^3$, and $R^4$ is independently $C_1$-$C_5$ alkyl; and a=1-10, b=0-30, c=0-10; and d=0-10; and
d) directing the thickened stream to the oil bearing formation for recycled usage in oil recovery.

8. The process of claim 7, further comprising
b.i) removing methane from the mixture of hydrocarbons and condensed carbon dioxide;
prior to step (c).

9. The process of claim 8, further comprising
b.ii) separating gasoline from the mixture of hydrocarbons and condensed carbon dioxide to obtain a hydrocarbon enriched stream of condensed carbon dioxide;
prior to step (c).

10. The process of claim 9, wherein said hydrocarbon enriched stream of condensed carbon dioxide of step b.ii) comprises a mixture of $C_2$-$C_8$ natural gas liquid hydrocarbons and is thickened without separation of the condensed carbon dioxide and the hydrocarbons.

* * * * *